United States Patent [19]

Rosenbaum et al.

[11] 3,731,122

[45] May 1, 1973

[54] ELECTRICALLY CONTROLLED RESISTIVE WEIGHTS

[75] Inventors: Erik Rosenbaum, Randallstown; Edward George Klimchak, Owing Mills, both of Md.

[73] Assignee: The Bendix Corporation, Southfield, Mich.

[22] Filed: Mar. 31, 1971

[21] Appl. No.: 129,729

[52] U.S. Cl. ....................307/264, 307/238, 307/304

[51] Int. Cl. ..............................................H03k 1/14

[58] Field of Search.......................307/238, 264, 304

[56] References Cited

UNITED STATES PATENTS

| | | | |
|---|---|---|---|
| 3,549,911 | 12/1970 | Scott, Jr. | 307/235 X |
| 3,373,295 | 3/1968 | Lambert | 307/238 |

*Primary Examiner*—John Zazworsky
*Attorney*—Plante, Hartz, Smith & Thompson, Bruce L. Lamb and William G. Christoforo

[57] ABSTRACT

A field effect transistor has a source-drain circuit which functions as a variable electrical resistance. A memory capacitor has one end connected to the field effect transistor gate and the second end connectable through a switching transistor to ground. Charges are added or subtracted from the capacitor to vary the FET gate bias and thereby the FET drain-source resistance. The switching transistor is effective to either apply the capacitor voltage to the FET gate or alternately to cause the capacitor to apply a pinch-off voltage to the FET gate by either grounding the capacitor's second end or applying pinch-off voltage to the capacitor's second end. In either event the charge across the capacitor is unaltered. The electrically controlled weight described is particularly adapted for use in a hyperplane signature recognizer.

7 Claims, 8 Drawing Figures

INVENTORS
ERIK ROSENBAUM
EDWARD G. KLIMCHAK
BY
William G. Christoforo
ATTORNEY

INVENTORS
ERIK ROSENBAUM
EDWARD G. KLIMCHAK
BY
*William G. Christoforo*
ATTORNEY

ELECTRICALLY CONTROLLED RESISTIVE WEIGHTS

CROSS REFERENCE TO A RELATED APPLICATION

There is disclosed herein means for adjusting electrically controlled weights as used in a radar signature recognizer and which is more fully disclosed in an application having Ser. No. 129,728 and filed Mar. 31, 1971 for "Digitally Controlled Weight Adjustment System" by the same inventors and owned by the same assignee.

BACKGROUND OF THE INVENTION

This invention relates to electrically controlled resistances, and more particularly to such resistances which may be set at a required value and which additionally include a memory. Thereby the resistance may be increased to infinity upon being disabled and will return to its original set value upon being re-enabled. This invention has particular application to hyperplane radar signature recognizers and particularly to those recognizers which operate in real time.

The currently evolving discipline of pattern recognition, in the case of radar signal returns, is concerned with analyzing the radar return, which herein is termed the radar signature, to determine whether the signature belongs to a certain class of signals. As an example, the pattern recognizer might be required to determine whether the return is from an aircraft as opposed to the return from a missile or other possible types of targets. It is known that the radar signature of an aircraft will differ from the radar signature of other possible targets. It is also known that in spite of the differing radar signatures of various aircraft angles of attack, that certain techniques are available to the skilled practitioner in the pattern recognition art which allow a signature to be analyzed and a value assigned to the signature which is a measure of the uncertainty that the signature belongs to the desired class, in this case, that class of radar signatures characteristic of radar returns from an aircraft.

Briefly, the signature is analyzed by processing methods which include weighing predetermined points in the signature and combining the results of this weighing to obtain a measure of recognition. The weights are adjusted, almost invariably, through the use of computers and known hyperplane teaching algorithms, so that the recognition measurements for the radar signatures of various aircraft will plot in one section and the radar signatures of possible targets which are not aircraft will plot at another section of the hyperplane space.

SUMMARY OF THE INVENTION

It is an object of this invention to provide a weighing network for use with a pattern recognizer.

It is another object of this invention to provide a weighing network for a pattern recognizer wherein the weight can be easily and quickly set to its desired value.

It is one more object of this invention to provide an electrically controlled resistance which is self-calibrating.

These and other objects of the invention are accomplished by providing a field effect transistor whose source-drain circuit functions as a variable resistor by adjusting the voltage at the gate electrode. A capacitor is connectable, through a switching transistor, between the gate electrode and ground, with the switching transistor being additionally effective to remove the ground and to substitute therefore a different constant voltage. With one side of the capacitor grounded through the switching transistor charges are added to the capacitor to set the gate voltage and hence vary the value of the electrical resistance. When the switching transistor is switched so that the second voltage is applied in place of the ground, the voltage at the gate electrode is changed to a pinch-off voltage, to thus make the electrical resistance effectively infinite, without destroying the charge across the capacitor. When ground is once more restored by means of the switching transistor the electrical resistance will return to its original set value.

The pattern recognizer is suitably made up of a plurality of the electrical resistance circuits just described. In performing signature recognition the individual electrical weights are connected between selected taps on the delay line into a summing network. The individual weights are set to their proper value quickly and easily by a servo loop wherein the electrical weight is compared with the proper value of electrical weight with any resulting error signal being used to change the electrical weight.

DESCRIPTION OF THE PREFERRED EMBODIMENT

Figure 1:
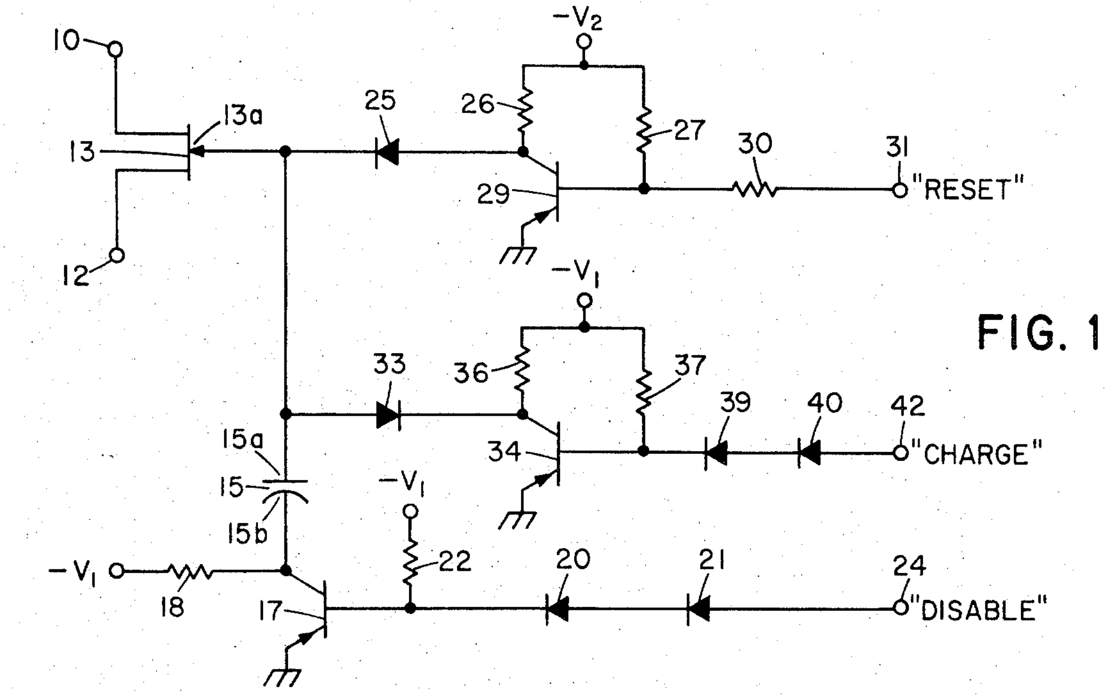
FIG. 1 is a schematic of an electrical weight illustrating the invention.

Referring to the figures wherein like numerals refer to like elements and more particularly first referring to FIG. 1 there is seen a field effect transistor (FET) 13 having a source-drain circuit connected between terminals 10 and 12. The resistance across terminals 10 and 12, through the source-drain circuit is dependent, as well known, upon the voltage at gate electrode 13*a*. The gate electrode is connected to one plate 15*a* of memory capacitor 15 whose other plate 15*b* is connected to the collector electrode of PNP transistor 17, which collector electrode is also connected to a source of negative voltage $-V_1$ (not shown) through resistor 18. The emitter of transistor 17 is grounded while the transistor base is connected through resistor 22 to the $-V_1$ voltage source and additionally through diodes 20 and 21 to "disable" terminal 24. Gate electrode 13*a* is also connected through diode 25 to the collector electrode of PNP transistor 29, whose emitter electrode is grounded. The collector electrode and base electrode of this transistor are connected to a second source of negative voltage $-V_2$ (not shown), respectively, through resistors 26 and 27. The base electrode of transistor 29 is also connected through resistor 30 to "reset" terminal 31. Gate electrode 13*a* is also connected through diode 33 to the collector electrode of PNP transistor 34, whose emitter electrode is grounded and whose collector and base electrodes are respectively connected through resistors 36 and 37 to the $-V_1$ voltage source. The base electrode of transistor 34 is also connected through diodes 39 and 40 to a "charge" terminal 42. For the embodiment shown voltage level $-V_2$ is substantially more negative than voltage level $-V_1$.

In normal operation of the circuit of FIG. 1 transistors 17 and 34 are saturated so that their collector electrodes are grounded, and transistor 29 is cut-off so that its collector electrode is at the $-V_2$ voltage level. In this condition both diodes 25 and 33 are back-biased and the voltage on capacitor plate 15*a* resulting from the charge thereof is applied directly to gate electrode 13*a*. Since gate electrode 13*a* has an inherently high input impedance the charge on plate 15*a* cannot bleed off and the capacitor will thus function as a memory for charges stored thereon. This voltage on gate 13*a*, of course, determines the resistance between terminals 10 and 12.

The resistance between terminals 10 and 12 can now be made almost infinite, that is, field effect transistor 13 can be pinched-off, by applying a positive signal to "disable" terminal 24, which is thus applied through diodes 20 and 21, which in this case operate merely as solid state impedance elements, to the base electrode of transistor 17. This transistor thus cuts off and the collector electrode thereof drops to the $-V_1$ voltage level. Since plate 15*b* of capacitor 15 is connected to this collector electrode its voltage also drops to the $-V_1$ voltage level. Simultaneously, of course, the voltage at plate 15*a* drops by the same amount as plate 15*b* while the voltage impressed across the capacitor remains constant. The voltage at plate 15*a* at this time is designed to be at least the pinch-off voltage of FET 13, thus causing the resistance between terminals 10 and 12 to become practically infinite. Upon removal of the positive signal at "disable" terminal 24, the collector electrode of transistor 17 is once more grounded causing the voltage at capacitor plate 15*a* and hence at gate electrode 13*a* to be restored to its original value.

The charge on plate 15*a* can be drained by applying a relatively negative voltage signal to "reset" terminal 31, which is thus applied by resistor 30 to the base electrode of transistor 29 thereby saturating that transistor. This effectively grounds the collector electrode of transistor 29 to thus discharge capacitor 15.

Capacitor 15 can subsequently be recharged by applying a positive voltage signal at "charge terminal" 42 which is thus applied through resistor diodes 39 and 40 to the base electrode of transistor 34 to thus disable that transistor. This removes the ground from the collector electrode of that transistor and allows plate 15*a* to accumulate charges from the $-V_1$ voltage source through resistor 36 and diode 33. In this manner capacitor 15 may charge to a voltage equal to the entire $-V_1$ voltage source less, of course, the negligible voltage drop across diode 33.

Figure 2:
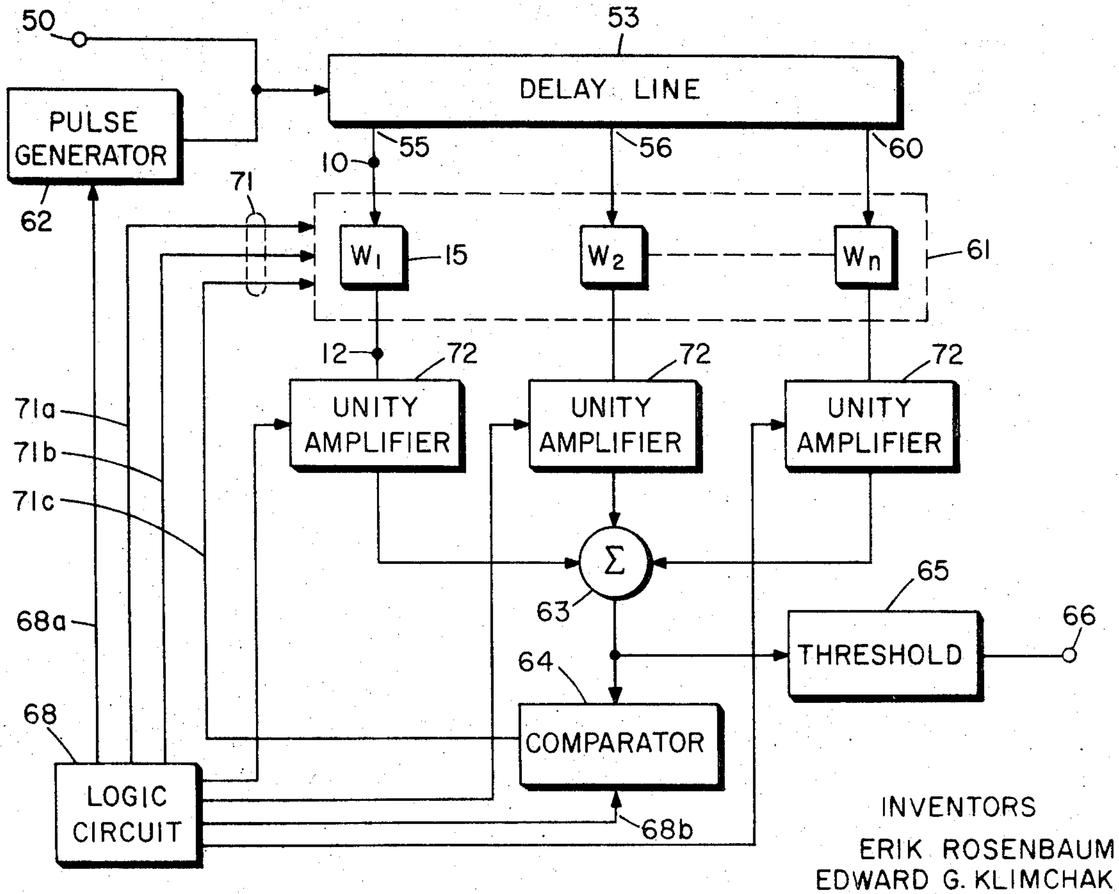
FIG. 2 is a block diagram of a signature recognizer with which the electrical weights of this invention can be used.

Referring now to FIG. 2 there is seen a radar signature recognizer which uses the electrically controlled weights of FIG. 1. In this illustration, a plurality of electrically controlled weights is used, for example, weights $W_1$, $W_2$ and $W_n$. The weights are respectively connected to the output taps 55, 56 and 60 of delay line 53. Each weight is basically comprised of the circuitry of FIG. 1 wherein FET 13 of that figure has terminal 10 connected to the delay line output tap and terminal 12 connected through a unity amplifier 72 to the input of the summing network 63 of FIG. 2. In the case of weight $W_1$, FET terminal 10 is connected to the delay line output tap 55 while FET terminal 12 is connected through the unity amplifier 72 to the summing network 63. Unity amplifier 72 has the property of passing the signal at terminal 12 unattenuated into summing network 63 or to invert the signal at terminal 12 in accordance with signals received from logic circuit 68. Thus, the weights are made effectively either positive or negative as required. Dotted block 61 drawn about the weights represent a plurality of electrical transmission line sets, each set consisting of three lines, as an example, set 71. One set of these transmission lines is provided for each electrical weight, with one line being connected to "reset" terminal 31 of FIG. 1, a second line being connected to "charge" terminal 42, and the third line being connected to "disable" terminal 24.

Assuming that the proper values have been set into the weights of FIG. 2, the operation of the radar signature recognizer of that figure is as follows. A radar signature, suitably from a radar receiver or possibly from a radar signature storage device, is impressed at terminal 50 from whence it is propagated along delay line 53. Spaced portions of the signature are presented at delay line taps 55, 56 and 60 and are sampled and weighed respectively by weights $W_1$, $W_2$ and $W_n$. The various weighed samples are either conducted directly or inverted by unity amplifier 72 to summing network 63 where they are combined, the obtained sum being applied to threshold 65 which generates an output signal at terminal 66 if the sum exceeds the preset threshold.

Figures 3A, 3B, 3C, 3D, 3E, 4:
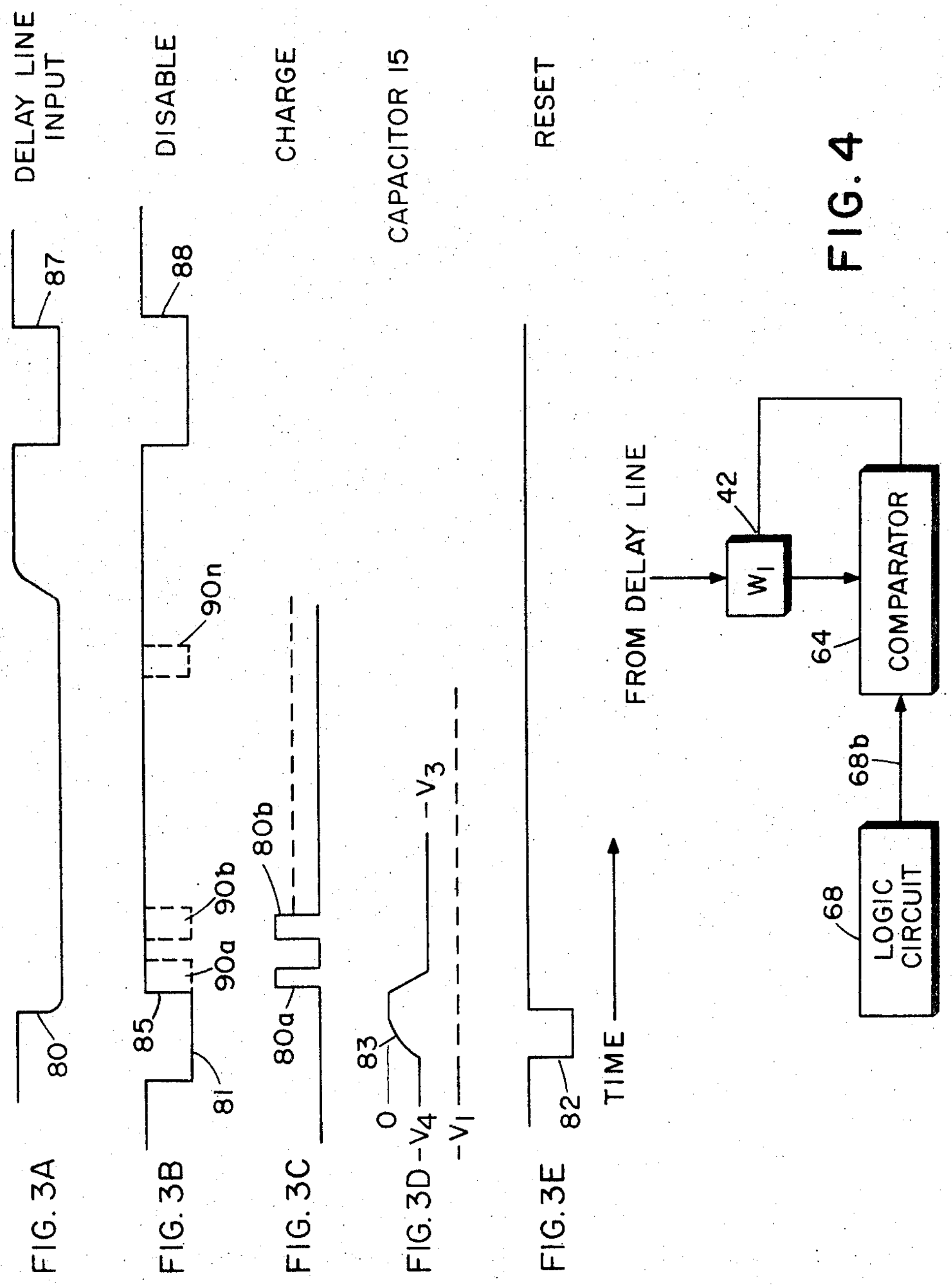
FIGS. 3A, 3B, 3C, 3D and 3E are timing diagrams useful for explaining the operation of setting the individual weights to the recognition system.
FIG. 4 is a simple block diagram showing a computer controlled servo loop for setting the resistance value of the electrical weight.

Reference should now be made to FIGS. 1, 2 and 3 for the purpose of explaining the means and methods by which electrically controlled weights, $W_1$, $W_2$ and $W_n$, are adjusted to their proper values. As has previously been mentioned, computer algorithms are known by which proper recognizer weights for hyperplane recognizers can be derived. These weights can be conveniently stored in a memory. This memory is included in logic circuit 68 of FIG. 2. The logic circuit will also generate proper timing signals for setting the electrically controlled weights as follows. In resetting the controlled weights the logic circuit will first generate a signal along line 71a which will be applied to each "reset" terminal 31 of FIG. 1. This will reset the memory capacitor 15 of each of the weights. The "reset" pulse is seen as pulse 82 of FIG. 3E.

The voltage across capacitor 15 is seen in FIG. 3D where during the time of the reset pulse the voltage will discharge along the discharge curve 83 from an assumed previously memorized $-V_4$ voltage level to a 0 voltage level. Simultaneously with the "reset" pulse a negative pulse signal 81, as seen in FIG. 3B, is generated by logic circuit 68 and applied to terminal 24 of one of the weights, for example $W_1$, via line 71*b*. Simultaneously, the same negative pulse signal 81 is applied to the terminals 24 of the other weights via lines (not shown) parallel to line 71*b* to render each transistor 17 conductive and insure that ground voltage appears at capacitor plate 15*b*.

Immediately after the termination of the "reset" pulse 82 the logic circuitry will generate a signal along line 68*a* to trigger a pulse generator 62, suitably a one-shot, to generate an output pulse into delay line 53. This pulse will be of standard amplitude, generally equal to the maximum amplitude expected from a radar signature. This delay line input is seen as signal 80 at FIG. 3A. Immediately after all weights have been reset to zero all weights will be disabled except for the first weight $W_1$. This is accomplished by a "disable" signal 85 which is generated by logic circuit 68 and applied via all lines (not shown), previously described as running parallel to line 71*b*, to terminal 24 of each weight except for $W_1$, so that pinch-off voltage is applied to all FETs 13 except $W_1$ and where the dotted signal 90*a* within the envelope of signal 85 represents the negative signal remaining at this time on terminal 24 of weight $W_1$. While the first weight is enabled the computer will generate the desired value of $W_1$ on line 68*b* to apply it to comparator 64. The comparator will generate along line 71c a charging pulse 80*a* of FIG. 3C which is applied to "charge" terminal 42 of the first weight. At this time the servo loop of FIG. 4, reference to which figure should now be made, is established. Logic circuit 68, as aforementioned, generates a reference along line 68*b* into comparator 64. Simultaneously the output from the delay line tap 55 as weighed by weight $W_1$, and inverted or not as determined also by signals from logic circuit 68, is also applied to the comparator. Any error signal is applied to terminal 42 of W, to adjust the weight to its proper value. FIG. 3D shows the voltage across capacitor 15 falling to the $-V_3$ voltage level, which is the voltage level at which the resistance through FET 13 is equal to the reference generated by the logic circuit. At this time, of course, charging pulse 80*a* is extinguished and the capacitor has been set. During the time that weight $W_1$ is being set it will be remembered that all other weights are disabled, thus the summing network 63 during this time receives no other inputs except from weight $W_1$ and is hence ineffectual except as a transmission line and hence not shown in FIG. 4. Subsequently weight $W_1$ is disabled and weight $W_2$ is enabled by dotted pulse 90b, applied via a line (not shown) running parallel to line 71*b* and connecting logic circuit 68 to terminal 24 of $W_2$. At the same time the proper reference for $W_2$ is generated along line 68*b*. Weight $W_2$ is then set to its proper value by signal 80*b* from comparator 64 applied via a line (not shown) parallel to line 71*c* and connected to terminal 42 of $W_2$. The remaining following weights are also set to their proper values in turn, in the same manner as previously described.

After all the weights have been set the recognizer is ready to receive a radar signature. This signature is represented by pulse 87 though, of course, the actual radar signatures will have a distinctive waveform. During the time the radar signature is received and propagating through the delay line the computer will generate a signal as seen in pulse 88 of FIG. 3B, which will enable all of the weights simultaneously so that the signature can be recognized.

It should be particularly noted that all of the control inputs to the electrically controlled weight of FIG. 1 can be conveniently controlled by digital logic. Thus the electrically controlled weight presents a convenient interface to a digital computer or other type of digital logic.

The invention claimed is:

1. An electrically controlled resistance comprising:
   a field effect transistor having a gate electrode, and a source-drain circuit comprising said electrically controlled resistance;
   memory means connected to said gate electrode for storing an electrical voltage signal and for applying said electrical voltage signal to said gate electrode whereby said resistance is controlled;
   means responsive to a first signal for removing any electrical voltage signal stored in said memory means;
   means responsive to a second signal for storing an electrical signal in said memory means; and,
   means responsive to a third signal for applying a pinch-off voltage to said gate electrode without changing an electrical voltage signal stored in said memory means.

2. A means for recognizing a particular signal signature in a signal which includes a delay time having a first plurality of means for simultaneously sampling a plurality of different points in said signal, a plurality of weights for weighing said signal as sampled, and a utilization means, wherein each of said weights comprises:
   a field effect transistor having a gate electrode, and a source-drain circuit connected between one of said plurality of means and said utilization means;
   memory means connected to said gate electrode for storing an electrical voltage signal and for applying said electrical voltage signal to said gate electrode; and
   means for applying a pinch-off voltage to said gate electrode without changing said electrical voltage signal stored in said memory means.

3. Means as recited in claim 2 wherein said memory means is a capacitor having one end connected to said gate electrode and a second end, and a voltage source having at least first and second terminals, and means connecting said first terminal to said capacitor's second end.

4. Means as recited in claim 3 and wherein said means for applying a pinch-off voltage comprises:
   switching means for selectively interrupting the connection of said first terminal to said capacitor's second end and connecting said second terminal to said capacitor's second end.

5. Means as recited in claim 4 with additionally second switching means for selectively removing the electrical voltage signal stored on said capacitor.

6. Means as recited in claim 2 wherein said utilization means comprises means for summing said weighted samples and threshold means for recognizing when the sum of said weighted samples exceeds a predetermined threshold.

7. Means as recited in claim 6 wherein said memory means is a capacitor having one end connected to said gate electrode, and a second end, and with additionally:
   means for selectively removing electrical charges from said capacitor;

means for selectively applying electrical charges to said capacitor, a voltage source having at least first and second terminals;

and, means for selectively connecting said first and second terminals to said capacitor second end.

* * * * *